US012571985B2

(12) United States Patent
Hetzler

(10) Patent No.: US 12,571,985 B2
(45) Date of Patent: Mar. 10, 2026

(54) MEASURING DEVICE FOR INTERFEROMETRIC SHAPE MEASUREMENT

(71) Applicant: CARL ZEISS SMT GMBH, Oberkochen (DE)

(72) Inventor: Jochen Hetzler, Aalen (DE)

(73) Assignee: CARL ZEISS SMT GMBH, Oberkochen (DE)

( * ) Notice: Subject to any disclaimer, the term of this patent is extended or adjusted under 35 U.S.C. 154(b) by 223 days.

(21) Appl. No.: 17/889,856

(22) Filed: Aug. 17, 2022

(65) Prior Publication Data

US 2022/0390709 A1 Dec. 8, 2022

Related U.S. Application Data

(63) Continuation of application No. PCT/EP2021/053528, filed on Feb. 12, 2021.

(30) Foreign Application Priority Data

Feb. 17, 2020 (DE) ..................... 10 2020 201 958.4

(51) Int. Cl.
*G02B 7/182* (2021.01)
*G01B 11/24* (2006.01)
(Continued)

(52) U.S. Cl.
CPC ........ *G02B 7/1821* (2013.01); *G01B 11/2441* (2013.01); *G01B 11/30* (2013.01); *G02B 26/0816* (2013.01)

(58) Field of Classification Search
CPC .............. G02B 7/1821; G02B 26/0816; G01B 11/2441; G01B 11/30
See application file for complete search history.

(56) References Cited

U.S. PATENT DOCUMENTS 4,626,062 A * 12/1986 Ishikawa .............. G02B 26/106
359/18
5,280,338 A * 1/1994 Drozdowicz ............. G01J 3/02
356/334
(Continued)

FOREIGN PATENT DOCUMENTS

CN 110567636 A 12/2019
CN 112598982 B * 7/2022 ............. G09B 23/22
(Continued)

OTHER PUBLICATIONS

Burge et al., "Measurement of aspheric mirror segments using Fizeau interferometry with CGH correction", Proc. of SPIE vol. 7739, (2011), 16 pages.
(Continued)

*Primary Examiner* — Michelle M Iacoletti
*Assistant Examiner* — Jarreas Underwood
(74) *Attorney, Agent, or Firm* — Edell, Shapiro & Finnan, LLC

(57) ABSTRACT

A measuring device (10) for the interferometric shape measurement of a surface (12) of a test object (14-1; 14-2) includes (i) a diffractive optical element (26-1; 26-2) that generates a test wave (28) from incoming measurement radiation (18), wherein the diffractive optical element radiates the test wave onto the surface of the test object, (ii) a deflection element (22) that is disposed upstream of the diffractive optical element in the beam path of the measurement radiation, and (iii) a holding device (24, 124) that holds the deflection element and that changes a position of the deflection element (22) through a combination of a tilting movement and a translation movement.

18 Claims, 5 Drawing Sheets

(51) Int. Cl.
  *G01B 11/30* (2006.01)
  *G02B 26/08* (2006.01)

(56) References Cited

U.S. PATENT DOCUMENTS

| | | | |
|---|---|---|---|
| 5,526,144 A * | 6/1996 | Dickson | G02B 5/32 |
| 6,437,857 B1 * | 8/2002 | Stockton | G01M 11/0292 |
| | | | 356/124.5 |
| 6,516,152 B1 * | 2/2003 | Mukai | G03B 13/06 |
| | | | 396/152 |
| 6,556,783 B1 * | 4/2003 | Gelphman | H04N 23/60 |
| | | | 356/610 |
| 7,061,626 B1 | 6/2006 | Schillke et al. | |
| 8,345,262 B2 | 1/2013 | Schillke et al. | |
| 8,687,203 B2 | 4/2014 | Doerband | |
| 2004/0046966 A1 * | 3/2004 | Fujita | G01B 11/2536 |
| | | | 356/604 |
| 2008/0123079 A1 * | 5/2008 | Numata | G01L 5/0047 |
| | | | 356/35.5 |
| 2008/0137090 A1 * | 6/2008 | Hetzler | G01B 11/2441 |
| | | | 356/458 |
| 2010/0225926 A1 | 9/2010 | van Amstel et al. | |
| 2012/0236316 A1 * | 9/2012 | Doerband | G01B 9/02085 |
| | | | 356/512 |
| 2018/0106591 A1 * | 4/2018 | Hetzler | G01M 11/0264 |
| 2020/0292384 A1 * | 9/2020 | Lu | G01J 3/10 |
| 2021/0033386 A1 * | 2/2021 | Liu | G01B 11/2441 |
| 2021/0223105 A1 * | 7/2021 | Ideguchi | G01J 3/021 |
| 2022/0011095 A1 | 1/2022 | Stiepan et al. | |

FOREIGN PATENT DOCUMENTS

| | | | | |
|---|---|---|---|---|
| DE | 102019204096 A1 | 10/2020 | | |
| JP | 2004279345 A | 10/2004 | | |
| RU | 2667335 C1 | 9/2018 | | |
| WO | WO-03058163 A1 * | 7/2003 | | G01B 11/24 |
| WO | 2020009150 A1 | 1/2020 | | |
| WO | 2020193277 A1 | 10/2020 | | |

OTHER PUBLICATIONS

Preliminary Report on Patentability, PCT/EP2021/053528, Aug. 23, 2022, 22 pages.

Liu et al., "Extended shift-rotation method for absolute interferometric testing of a spherical surface with pixel-level spatial resolution", Applied Optics, vol. 56, No. 16, Jun. 1, 2017, 6 pages.

European Office Action with English translation, Application No. 21705183.8, Aug. 10, 2023, 6 pages.

International Search Report, PCT/EP2021/053528, May 17, 2021, 4 pages.

Chinese Office Action with English translation, Application No. 202180028436.X, Apr. 30, 2025, 17 pages.

* cited by examiner

MEASURING DEVICE FOR INTERFEROMETRIC SHAPE MEASUREMENT

CROSS REFERENCE TO RELATED APPLICATIONS

This is a Continuation of International Application PCT/EP2021/053528 which has an international filing date of Feb. 12, 2021, and the disclosure of which is incorporated in its entirety into the present Continuation by reference. This Continuation also claims foreign priority under 35 U.S.C. § 119(a)-(d) to and also incorporates by reference, in its entirety, German Patent Application DE 10 2020 201 958.4 filed on Feb. 17, 2020.

FIELD OF THE INVENTION

The invention relates to a measurement apparatus and to a method for interferometric shape measurement of a surface of a test object. A microlithographic optical element, for example, can serve as the test object. As a result of the need for ever smaller structures, ever higher demands are placed on the optical properties of optical elements used in microlithography. The optical surface shape of these optical elements must therefore be determined with the highest possible accuracy.

BACKGROUND

Interferometric measurement apparatuses and methods in which a diffractive optical element produces a test wave and a reference wave from an input wave are known for the highly accurate interferometric measurement of optical surfaces down to the subnanometer range. The diffractive optical element allows the wavefront of the test wave to be adapted to a target surface of the test object so that the wavefront is substantially normally incident at every location on the target shape and is reflected back onto itself by the target shape. Deviations from the target shape can then be determined with the aid of an interferogram formed by superposing the reflected test wave on the reference wave.

U.S. Pat. No. 7,061,626 B2 describes such an interferometric measurement apparatus having a Fizeau element as reference element for generating the reference wave and a computer-generated hologram (CGH) for at least partially adapting a wavefront of a test wave to the surface to be measured. Furthermore, US2018/0106591A1 describes an alternative embodiment of the measurement apparatus mentioned in the introductory part, in which a complex encoded computer-generated hologram (CGH) is used as diffractive optical element. From an input wave, the CGH generates both a test wave directed at the surface to be measured and a plane reference wave running in a separate reference arm. The reference wave is reflected back to the CGH by a reflective optical reference element.

SUMMARY

If test objects with different target shapes are to be measured with the measurement apparatus, different CGHs are typically used. In order to measure a new test object of a different type. The previous CGH used to measure a first test object is thus replaced by a CGH adapted to the target shape of the new test object. If the angle of incidence on the CGH remains the same, the new CGH often requires a change in the position of the test object and, if applicable, the reference element. This results in a high space requirement within the interferometer, i.e., a compact design of the interferometer is made very difficult thereby.

This problem is solved in U.S. Pat. No. 7,061,626 B1 by configuring the CGHs so that the position of the test object remains substantially the same. However, this configuration of the CGHs means that the CGHs have to be illuminated with different angles of incidence. In the prior art mentioned, differently configured prisms are used to generate the different angles of incidence. In each case, a prism configured to generate the required angle of incidence is arranged in the beam path upstream of the corresponding CGH.

However, the use of differently configured prisms to generate the different angles of incidence leads to a considerable amount of conversion work on the measurement apparatus and therefore makes the operation of the measurement apparatus inflexible. Furthermore, this procedure involves considerable costs, since the prisms adapted to the corresponding CGHs have to be specially manufactured.

It is an object of the invention to provide a measurement apparatus and a measurement method with which the aforementioned problems are addressed. In particular, an object of the invention is to provide a measurement apparatus and a measurement method with which test objects with different surface shapes can be measured without major conversion work.

The abovementioned object is addressed, according to one formulation of the invention, for example, with a measurement apparatus for interferometric shape measurement of a surface of a test object with a diffractive optical element for generating a test wave, configured to radiate onto the surface of the test object, from an incoming measurement radiation, a deflection element upstream of the diffractive optical element in the beam path of the measurement radiation, and a holding device for holding the deflection element, which holding device is configured to change a position of the deflection element by a combination of a tilting movement and a translational movement.

Such a combination of a tilting movement and a translational movement can take place by tilting the deflection element, in particular rotating it, about a tilt axis extending within the deflection element or substantially through the centroid of the deflection element and a displacement of the deflection element independent of the tilting. Alternatively, the combination of a tilting movement and a translational movement can take place through a rotation about an axis of rotation that is situated at a considerable distance from the centroid of the deflection element. A deflection element is understood to mean a module for changing the propagation direction of the measurement radiation, in particular by an angle of at least 20°, at least 40°, or even at least 80°.

The provision according to the invention of a deflection element that is positionable in the different positions mentioned allows test objects with different surface shapes to be measured without major reconfiguration of the measurement apparatus and thus without major conversion work. Due to the adjustability of the position of the deflection element, the position for the test object can substantially remain the same and, if necessary, a repositioning of the reference element can be avoided. The measurement apparatus can thus be designed to be compact. At the same time, it is not necessary to incorporate a specially adapted beam orientation element for the respective test object, such as a prism specially provided therefor, with the result that different surface shapes can be measured with comparatively little effort.

According to one embodiment, the holding device is configured to displace a position of the deflection element by at least 2 mm, in particular by at least 10 mm, through the translational movement.

According to one embodiment, the holding device is configured to change a tilted position of the deflection element by at least 2 mrad, in particular by at least 10 mrad, through the tilting movement. If the aforementioned combination of tilting and translational movement is a rotation about an axis of rotation that is located at a considerable distance from the centroid of the deflection element, the deflection element simultaneously experiences a change in its orientation and in its spatial position when the rotational movement is executed, i.e., the aforementioned change in the position of the deflection element can already be brought about by the execution of this rotational movement, but if necessary a translational movement can also take place.

The combination of changing the orientation and changing the spatial position of the deflection element makes it possible to vary the angle of incidence onto the diffractive optical element without changing the spatial position of the diffractive optical element in the process.

According to a further embodiment, the holding device is configured to change the position of the deflection element so that a central point of incidence of the measurement radiation on the deflection element is displaced by at least 2 mm, in particular by at least 10 mm.

According to a further embodiment, the holding device comprises a tilting actuator for executing the tilting movement and a separate displacement actuator for executing the translational movement.

According to a further embodiment, the holding device has a curved guide rail. In particular, the guide rail is designed in the form of a circular segment. According to an embodiment variant, the deflection element is attached to a guide part for executing a reciprocating movement within the guide rail.

According to a further embodiment, the combination of the tilting movement and the translational movement is effected by a rotational movement with respect to an axis of rotation, wherein the axis of rotation is located at a distance of at least 2 mm, in particular at least 5 mm, from a geometric centroid of the deflection element. In particular, the axis of rotation is arranged outside of the deflection element.

According to a further embodiment, the combination of the tilting movement and the translational movement is effected by a rotational movement with respect to an axis of rotation, wherein the axis of rotation is located at a distance of at least 2 mm, in particular at least 5 mm, from a central point of incidence of the measurement radiation on the deflection element. According to a further embodiment, the axis of rotation is located at a distance of at least 2 mm, in particular at least 5 mm, from a geometric centroid of the deflection element.

According to a further embodiment, the axis of rotation is arranged such that the intersection point of the axis of rotation with a beam plane, which is spanned by the direction vector of the measurement radiation radiated onto the deflection element and the direction vector of the measurement radiation emitted by the deflection element, is disposed in the beam plane on the same side with respect to an irradiation axis defined by the direction vector of the incoming measurement radiation as the diffractive optical element. In other words, both the diffractive optical element and the intersection point are arranged in an "upper hemisphere" with respect to an irradiation axis defined by the incoming measurement radiation.

According to a further embodiment, the axis of rotation is arranged so that the intersection point of the axis of rotation with the beam plane is disposed in a region which, in relation to the diffractive optical element, is on the opposite side of the irradiation axis, wherein the region has in the direction of the irradiation axis an extent of at most twice a distance of the diffractive optical element from the irradiation axis and has in the direction perpendicular to the irradiation axis an extent of at most three times the distance. According to a further embodiment, the region has an extent of at most once the distance both in the direction of the irradiation axis and transversely to the irradiation axis.

According to a further embodiment, the holding device comprises at least one actuator for executing the at least one rotational movement. In particular, the holding device comprises a further actuator for executing a translational movement.

According to a further embodiment, the deflection element comprises a deflection mirror. According to an alternative embodiment, the deflection element comprises a prism.

According to a further embodiment, the measurement apparatus has an interferometer cavity, and the deflection element is arranged outside of the interferometer cavity. The region of the interferometer in which the test wave and the reference wave do not run in the same beam path is called the interferometer cavity. In other words, the deflection element is arranged in the beam path of the measurement radiation even before the reference wave is split off. In this case, the reference wave can be split off with the diffractive optical element.

According to an alternative embodiment, the measurement apparatus has an interferometer cavity and the deflection element is arranged inside the cavity.

The abovementioned object is addressed, according to a further formulation the invention, with a method for interferometric shape measurement of a respective surface of test objects. The method comprises: radiating a measurement radiation onto a first diffractive optical element with a deflection element to generate a first test wave, and interferometrically measuring the surface shape of a first of the test objects using the first test wave, changing the position of the deflection element by a combination of a tilting movement and a translational movement, and radiating the measurement radiation onto a second diffractive optical element with the deflection element whose position has changed to generate a second test wave, and interferometrically measuring the surface shape of a second of the test objects using the second test wave. In particular, a position of the deflection element is displaced by at least 2 mm, in particular by at least 10 mm, during the translational movement.

According to one embodiment of the method according to the invention, instead of the first optical element, the second diffractive optical element is arranged in a test wave generation section of an interferometric measurement apparatus before the irradiation of the measurement radiation with the deflection element whose position has changed. In particular, the second diffractive optical element is arranged in a holding device of the test head for a diffractive optical element for test wave generation. In particular, this holding device can be tilted and/or displaced.

According to a further embodiment, the second diffractive optical element is arranged in a rotational position which deviates from the rotational position of the first diffractive optical element. The deviation is at least 2 mrad, in particular at least 10 mrad. The respective rotational position of the two diffractive optical elements can be selected so that the beam path of the test wave and, if applicable, of a reference wave is optimally adapted to the spatial conditions of the interferometric measurement apparatus, in particular with regard to the respective geometry of the test objects and the resulting configuration of the test wave in question.

The features specified with regard to the aforementioned embodiments, exemplary embodiments, and embodiment variants, etc. of the measurement apparatus according to the invention can correspondingly be transferred to the measurement method according to the invention. These and other features of the embodiments according to the invention will be explained in the description of the figures and in the claims. The individual features can be implemented, either separately or in combination, as embodiments of the invention. Furthermore, they can describe advantageous embodiments which are independently protectable and protection for which is claimed only during or after pendency of the application, as the case may be.

BRIEF DESCRIPTION OF THE DRAWINGS

The above and further advantageous features of the invention will be illustrated in the following detailed description of exemplary embodiments according to the invention with reference to the accompanying schematic drawings. In the drawings.

DETAILED DESCRIPTION

In the exemplary embodiments or embodiments or embodiment variants described below, elements which are functionally or structurally similar to one another are provided with the same or similar reference signs as far as possible. Therefore, for understanding the features of the individual elements of a specific exemplary embodiment, reference should be made to the description of other exemplary embodiments or the general description of the invention.

Figure 1:
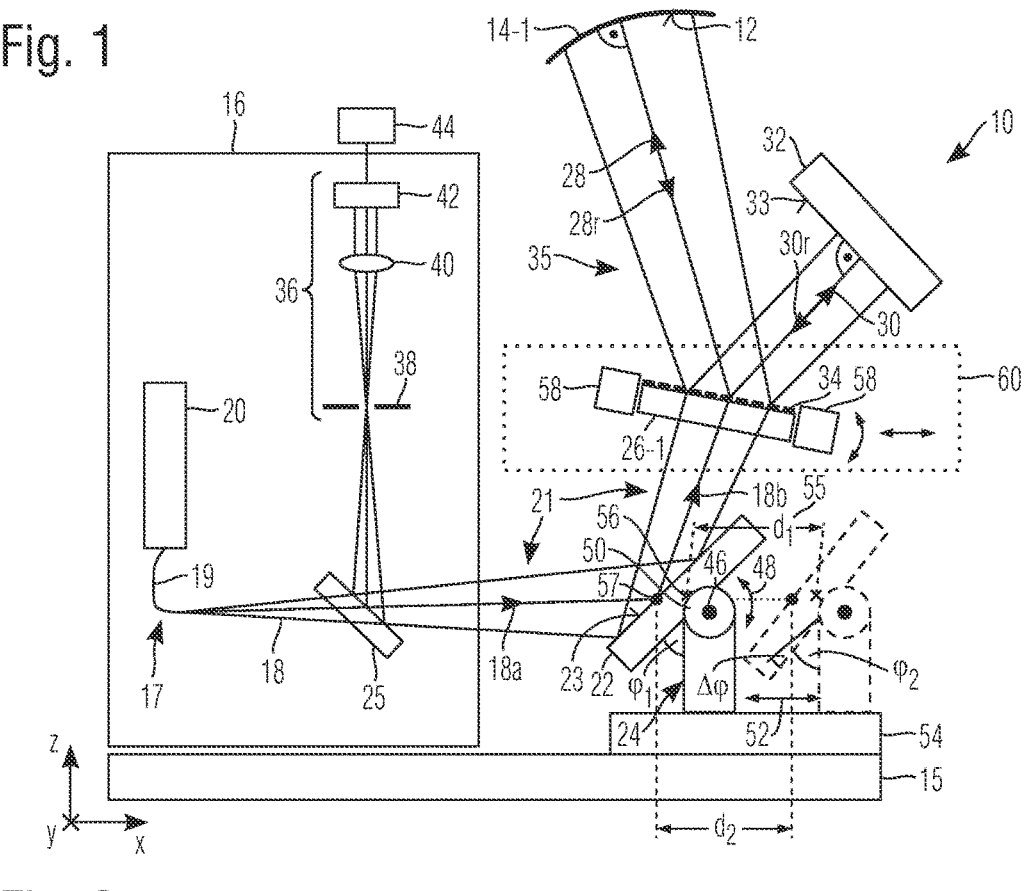
FIG. 1 shows a first embodiment of a measurement apparatus for interferometric shape measurement of a surface of a test object with a deflection element, which is mounted with a holding device that is tiltable and displaceable, wherein the measurement apparatus is arranged in a configuration for measuring a first test object.

In order to facilitate the description, a Cartesian xyz-coordinate system is indicated in the drawing, from which system the respective positional relationship of the components illustrated in the figures is evident. In FIG. 1, the y-direction extends perpendicularly to the plane of the drawing into said plane, the x-direction extends toward the right, and the z-direction extends upward.

FIG. 1 shows an exemplary embodiment of a measurement apparatus 10 for interferometric shape measurement of an optical surface 12 of a test object 14-1. The measurement apparatus 10 can be used, in particular, to determine a deviation of the actual shape of the surface 12 from a target shape. The test object 14-1 provided can be, for example, a mirror of a projection lens for EUV microlithography having a non-spherical surface for reflecting EUV radiation at a wavelength of less than 100 nm, in particular a wavelength of approximately 13.5 nm or approximately 6.8 nm. The non-spherical surface of the mirror can have, for example, a free-form surface with a deviation of more than 5 μm from each rotation-symmetric asphere and a deviation of at least 1 mm from each sphere.

The measurement apparatus 10 contains a frame 15, an illumination/detection module 16, a deflection element 22, a holding device 24 for holding the deflection element 22, a diffractive optical element 26-1, and a reference element 32. The illumination/detection module 16 comprises a radiation source 17, a beam splitter 25, and an observation unit 36.

The radiation source 17 is used to provide sufficiently coherent measurement radiation 18 as an input wave. In this exemplary embodiment, the radiation source 17 comprises a waveguide 19 having an exit surface from which the input wave originates. The waveguide 20 is connected to a radiation-generating module 20, e.g., in the form of a laser. By way of example, a helium-neon laser with a wavelength of about 633 nm can be provided to this end. However, the measurement radiation 18 can also have a different wavelength in the visible or non-visible wavelength range of electromagnetic radiation.

The radiation source 17 with the waveguide 19 represents merely an example of a radiation source 17 that can be used for the measurement apparatus 10. In alternative embodiments, rather than the waveguide 19, an optical arrangement with lens elements, mirror elements or the like can be provided for providing a suitable input wave from the measurement radiation 18.

The measurement radiation 18 first passes through the beam splitter 25 and is then steered onto the diffractive optical element 26-1 by the deflection element 22, which in the embodiment shown in FIG. 1 is designed as a reflective optical element with a reflection surface 23, i.e., as a deflection mirror. In other words, the deflection element 22 is located upstream of the diffractive optical element 26-1 in a beam path 21 of the measurement radiation 18. The measurement radiation radiated onto the deflection element 22 is denoted in FIG. 1 by the reference sign 18a, and the measurement radiation 18 emitted by the deflection element is denoted by the reference sign 18b. The diffractive optical element 26-1 is arranged in a test wave generation section 60 of the measurement apparatus 10. Said section forms a test head, which is used to generate a test wave 28 for radiating onto the surface 12 of the test object 14-1. In the embodiment according to FIG. 1, the diffractive optical element 26-1 generates, in addition to the test wave 28, a reference wave 30 from the incident measurement radiation 18*b*.

Furthermore, the measurement arrangement 10 comprises a reference element 32, designed as a reflective optical element, with a reflection surface 33 for reflecting the reference wave 30 into a returning reference wave 30*r*. The diffractive optical element 26-1 is designed in the form of a complex encoded CGH and contains diffractive structures 34 which, according to the embodiment illustrated in FIG. 1, form two diffractive structure patterns that are arranged mutually superposed in a plane. The diffractive optical element 30 is therefore also referred to as a twice complex encoded computer-generated hologram (CGH). Alternatively, the diffraction structures could also have more than two diffractive structure patterns arranged mutually superposed in a plane, for example five diffractive structure patterns arranged mutually superposed, for additionally producing calibration waves.

The two diffractive structure patterns of the diffractive optical element 26-1 according to FIG. 1 can be formed, for example, by a first structure pattern in the form of a bottom grating and a second diffractive structure pattern in the form of a top grating. One of the diffractive structure patterns is configured to produce the test wave 28, which is directed at the test object 14-1 and has a wavefront that is at least partially adapted to a target shape of the optical surface 12. The test wave 28 is reflected at the optical surface 12 of the test object 14-1 and returns to the diffractive optical element 26-1 as a returning test wave 28*r*. Due to the wavefront that is adapted to the target shape of the optical surface 12, the test wave 34 is substantially normally incident at every location on the optical surface 12 and is reflected back on itself.

The other diffractive structure pattern produces the reference wave 30, which is directed at the reference element 32 and has a plane wavefront. In alternative exemplary embodiments, a simply encoded CGH with a diffractive structure or another optical grating can be used instead of the complex encoded CGH. The test wave 28 can for example be produced in a first order of diffraction, and the reference wave 30 can be produced in the zero or any other order of diffraction at the diffractive structure.

The reference element 32 in the present embodiment is designed in the form of a plane mirror for back-reflection of the reference wave 30 with a plane wavefront. In another embodiment, the reference wave 30 can have a spherical wavefront, and the reference element 32 can be designed as a spherical mirror.

The test wave 28*r* returning from the surface 12 passes through the diffractive optical element 26-1 again and is diffracted again in the process. In this case, the returning test wave 28*r* is transformed back into an approximately spherical wave, wherein the wavefront thereof has corresponding deviations from a spherical wavefront due to deviations of the surface 12 of the test object from the target shape.

The returning reference wave 30*r* reflected by the reflection surface of the reference element 32 also passes through the diffractive optical element 26-1 again and is again diffracted in the process. In this case, the returning reference wave 30*r* is transformed back into a spherical wave. In an alternative embodiment with a collimator in the beam path of the measurement radiation 18 radiated onto the diffractive optical element 26-1 for generating an input wave with a plane wavefront, the wavefront of the returning reference wave 30*r* does not need to be adapted by the diffractive optical element 30.

The region of the interferometer 10 in which the test wave 28 or 28*r* and the reference wave 30 do not travel in the same beam path is called the interferometer cavity. In the embodiment according to FIG. 1, the interferometer cavity 35 includes the beam path of the test wave 28 or 28*r* between the diffractive optical element 26-1 and the object under test 14-1 and the beam path of the reference wave 30 or 30*r* between the diffractive optical element 26-1 and the reference element 32. In the embodiment of the measurement apparatus 10 according to FIG. 1, as can be seen from the drawing, the deflection element 22 is arranged outside the interferometer cavity 35.

The diffractive optical element 26-1 also serves for superimposing the returning test wave 28*r* with the returning reference wave 30*r*. The returning waves 28*r* and 30*r* then travel in the beam path 21 of the incoming measurement radiation 18, via the deflection element 22, back to the beam splitter 25. The beam splitter 25 guides the combination of the returning test wave 28*r* and the returning reference wave 30*r* out of the beam path 21 of the incoming measurement radiation 18 and directs it onto the observation unit 36.

The returning test wave 28*r* and the returning reference wave 30*r* are incident on the beam splitter 25 as convergent beams and are reflected thereby in the direction of the observation unit 36. Both convergent beams pass through a stop 38 and an eyepiece 40 of the observation unit 36 and are finally incident on a two-dimensionally resolving detector 42 of the observation unit 36. The detector 42 can be designed, for example, as a CCD sensor and captures an interferogram produced by the interfering waves.

Furthermore, the measurement apparatus 10 comprises an evaluation device 44 for determining the actual shape of the optical surface 12 of the test object 14-1 from the captured interferogram or a plurality of captured interferograms. For this purpose, the evaluation device 44 has a suitable data processing unit and uses corresponding calculation methods known to a person skilled in the art. Alternatively or additionally, the measurement apparatus 10 can have a data memory or an interface with a network to make possible a determination of the surface shape using the interferogram that is stored or transmitted via the network by an external evaluation unit.

The holding device 24 already mentioned above is configured to adjust the deflection element 22 at least with regard to its rotational position. In the embodiment according to FIG. 1, the holding device 24 allows the position of the deflection element 22 to be both tilted and displaced, i.e., the position of the deflection element 22 to be changed by a combination of a tilting movement and a translational movement.

In the present case, it is possible to change the tilted position of the deflection element 22 by executing a tilting movement 48. This tilting movement 48 takes place by rotation with respect to a tilt axis 46 oriented transversely to the propagation direction of the incoming measurement radiation 18*a*, in the y-direction in FIG. 1. A tilting actuator 50 is provided to execute the tilting movement. The tilt axis can be arranged here on the reflection surface 23 of the deflection element 22 or in a position slightly spaced apart from the reflection surface 23, as shown in the configuration of the exemplary embodiment illustrated in FIG. 1. FIG. 1 shows the deflection element 22 in the illustration with solid lines in a first tilted position with a tilt angle $\varphi_1$ relative to the z-axis and in the illustration with broken lines in a second tilted position with a tilt angle $\varphi_2$. The tiltability of the deflection element 22, represented by the difference angle $\Delta\varphi=\varphi_1-\varphi_2$, is at least 2 mrad, in particular at least 10 mrad. Alternatively or in addition to the tilt axis 46, a tilt axis arranged parallel to the propagation direction of the incoming measurement radiation 18*a* or in the x-direction according to FIG. 1 can be provided.

The displaceability of the position of the deflection element 22 is provided for at least one translational degree of freedom 52. In the present case, the translational degree of freedom is aligned parallel to the propagation direction of the incoming measurement radiation 18*a*, i.e., in the x-direction according to FIG. 1. In addition, for example, a translational degree of freedom aligned transversely to the propagation direction of the incoming measurement radiation 18*a* or in the y-direction according to FIG. 1 can also be provided. A displacement actuator 54 is provided to carry out the displacement of the deflection element 22. FIG. 1 illustrates the deflection element 22 in a first displacement position in the representation with solid lines and in a second displacement position in the representation with broken lines.

The displaceability of the deflection element 22 is configured so that the position of the deflection element 22 is displaced by at least 2 mm, in particular by at least 10 mm. This leads in particular to the fact that, after the displacement, the respective position of the geometric centroid 56 of the deflection element 22 changes by a distance $d_1$ (also referred to as displacement 55) of at least 2 mm, in particular at least 10 mm, in the direction of the translational degree of freedom in question. Alternatively or additionally, the displaceability allows a change in the position of a central point of incidence 57 of the measurement radiation 18*a* on the deflection element 22 by at least 2 mm, in particular by at least 10 mm, in the direction of the translational degree of freedom in question.

The described adjustment degrees of freedom of the tilted and translational position of the deflection element make it possible for the measurement radiation 18*b* emitted by the deflection element 22 to be radiated onto the diffractive optical element 26-1 in a precise position and orientation. The position and orientation of the measurement radiation 18*b* can be adjusted specifically to the structure of the diffractive optical element 26 selected for measuring the relevant test object 14-1 and to its position and orientation selected for this purpose.

In other words, to measure the surface 12 of a test object 14-1, a diffractive optical element 26-1 specifically adapted to the target surface shape of the relevant test object 14-1 is produced. The design for the diffraction structures 34 on the diffractive optical element 26-1 is selected such that the test wave 28 generated thereby is emitted with a wavefront that corresponds to the target surface shape, and the reference wave 30 is emitted in directions that allow a compact arrangement of the test object 14-1 and reference element 32 within the measurement apparatus 10.

Depending on the selected design of the diffraction structures 34, there is a preferred orientation of the diffractive optical element 26-1 within the measurement apparatus 10, which is tiltable with respect to at least one tilt axis and/or displaceable with respect to at least one translational degree of freedom with a holding device 58 of the test head. According to the embodiment illustrated in FIG. 1, the holding device 58 enables the diffractive optical element 26-1 to be tilted with respect to the y-axis and displaced in the direction of the x-axis.

In order to measure the surface shape of the test object 14-1, the optical element 26-1 provided for this purpose is now arranged in the preferred orientation and position by with the holding device 58. This results in a suitable angle of incidence for the measurement radiation 18*b* onto the diffractive optical element 34. This angle of incidence is now brought about by suitably setting the tilt angle and translational position of the deflection element 22 with the holding device 24. In particular, the tilt angle and translational position of the deflection element 22 are selected such that the diffractive optical element 34 is impinged upon centrally by the measurement radiation 18*b*.

Figure 2:
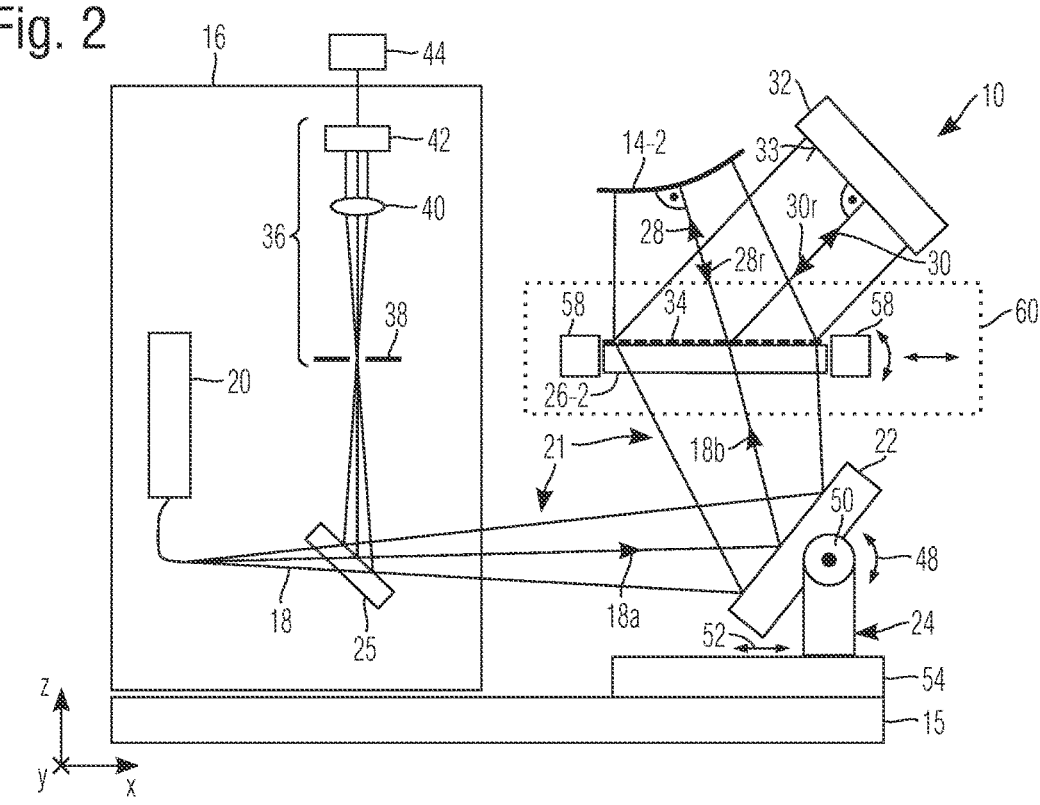
FIG. 2 shows the measurement apparatus according to FIG. 1 in a configuration for measuring a second test object.

If the surface shape of a further test object 14-2 is then intended to be measured, the diffractive optical element 26-1 is replaced, according to the illustration in FIG. 2, by a further diffractive optical element 26-2 in the holding device 58 of the test head. The diffraction structures 34 of the further diffractive optical element 26-2 are produced specifically for measuring the surface shape of the further test object 14-2. The diffraction structures 34 are selected here so that the test wave 28 generated thereby has a wavefront that is adapted to the target surface shape of the test object 14-2 and the configuration of the beam paths of the test wave 28 and of the reference wave 30 are adapted to the spatial conditions in the measurement apparatus 10. A preferred orientation and positioning of the diffractive optical element 26-2 results from the design of the diffraction structures 34 of the further diffractive optical element 26-2, taking into account the spatial conditions in the measurement apparatus 10. This orientation and positioning is set with the holding device 58 of the test head.

From this orientation and positioning of the diffractive optical element 26-2, taking into account the design of the diffraction structures 34, a suitable angle of incidence for the measurement radiation 18*b* onto the diffractive optical element 34 is obtained. This angle of incidence is now set by suitably changing the position of the deflection element 22 with the holding device 24. The position of the deflection element 22 illustrated in FIG. 2 corresponds to the position that is illustrated in FIG. 1 with broken lines and has already been described in more detail above.

The change in the position of the deflection element 22 thus comprises a change in the tilt angle and translational position of the deflection element 22 using the holding device 24. The change in the translational position of the deflection element 22 substantially serves to compensate for the changed tilt angle so that the point of incidence on the diffractive optical element 26-2 continues to lie in the region of the test wave generation section 60. In other words, if there is no translation of the deflection element 22, the position of the diffractive optical element 26-2 would have to be displaced so far that it would no longer lie in the region of the test wave generation section 60 or it would not be possible to reconcile the position thereof with the spatial conditions in the measurement apparatus 10.

In the configuration of the measurement apparatus 10 shown in FIG. 2, the actual shape of the optical surface 12 of the test object 14-2 is generated from one or more interferograms generated by superimposing the returning test wave 28*r* with the returning reference wave 30*r*, analogously to what is described with reference to FIG. 1.

Figure 3:
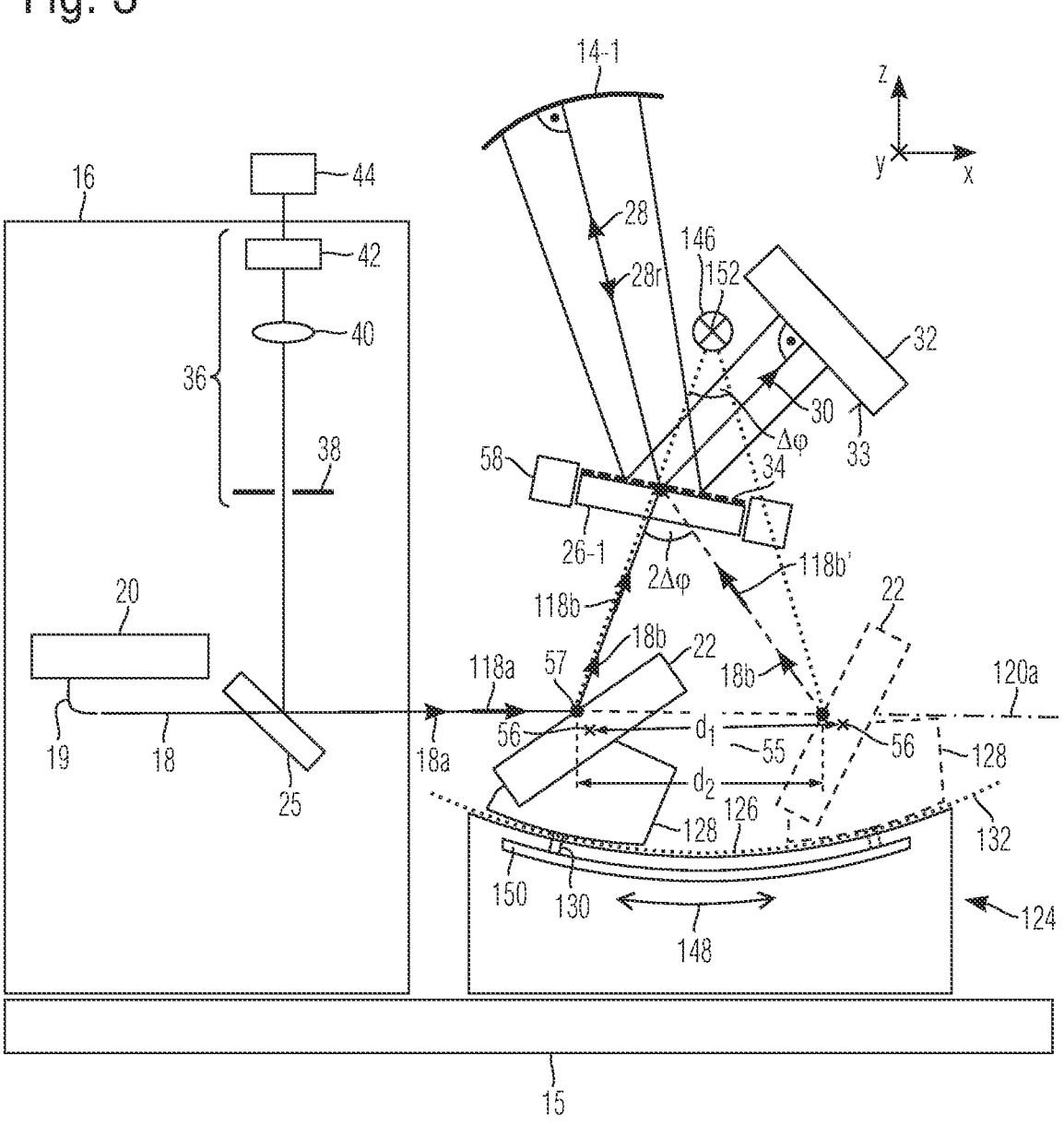
FIG. 3 shows a further embodiment of a measurement apparatus for interferometric shape measurement of a surface of a test object with an alternative holding device for tilting and displacing the deflection element by rotation about an axis of rotation disposed outside of the deflection element.

A further embodiment of the interferometric measurement apparatus 10 is illustrated in FIG. 3. This differs from the measurement apparatus 10 according to FIG. 1 only in the configuration of the holding device 24 for the deflection element 22. This holding device is denoted by reference numeral 124 in the embodiment according to FIG. 3. In the illustration according to FIG. 3, the beam path of the measurement radiation 18 is drawn in with just one line instead of three lines in certain beam sections for better clarity.

The holding device 124 comprises a curved guide rail 126 attached to the frame 15 for guiding a guide part 128 attached to the deflection element 22. The curvature of the guide rail 126 runs here along a circumferential section 132. This section 132 is part of a circle in the plane of the drawing with the intersection point of an axis of rotation 146 with the plane of the drawing as the center 152. The deflection element 22 can be moved in a rotational movement 148 with respect to the axis of rotation 146 using the holding device 124. The rotational movement 148 corresponds to a combination of a tilting movement and a translational movement. The plane of the drawing is the plane which is spanned by the direction vector 118*a* of the incoming measurement radiation 18*a* and the direction vector 118*b* of the emitted measurement radiation 18*b*. This plane is also referred to as the beam plane in this text.

The axis of rotation 146 is arranged so that its intersection point with the plane of the drawing or the beam plane is arranged on the right above the middle point of incidence 57 of the incoming measurement radiation 18*a*. The intersection point mentioned in the beam plane is arranged in the upper hemisphere with respect to an irradiation axis 120*a* defined by the direction vector 118*a* and thus on the same side as the diffractive optical element 26-1 with respect to the irradiation axis 120*a*. As a result of the aforementioned arrangement of the axis of rotation 146, when the rotational movement 148 is executed, the position of the deflection element 22 is displaced by at least 2 mm, in particular by at least 10 mm (translational component of the rotational movement 148), and tilted by the difference tilt angle $\Delta\varphi$ of at least 2 mrad, in particular at least 10 mrad (tilting portion of the rotational movement 148).

The holding device 124 comprises an actuator 150 integrated into the module of the guide rail 126 for executing the rotational movement with respect to the axis of rotation 146. In the embodiment shown, the actuator 150 pulls a pin-like pulling element 130 of the guide part 128 along the circumferential section 132. In addition to the above-described first position of the deflection element 22 for irradiating the diffractive optical element 26-1, shown in solid lines, a second position of the deflection element 22 is shown in broken lines in FIG. 3. In this position, the deflection element 22 is tilted by $\Delta\varphi$ in relation to the first position. The second position is used to irradiate the further diffractive optical element 26-2 already illustrated in FIG. 2 with the measurement radiation 18*b*, wherein the direction vector 118*b*' is tilted by $2\Delta\varphi$ in relation to the direction vector 118*b* of the first position.

This leads in particular to the fact that, after the rotational movement 148, the respective position of the geometric centroid 56 of the deflection element 22 changes by a distance $d_1$ (also referred to as displacement 55) of at least 2 mm, in particular at least 10 mm, in the direction of the translational degree of freedom in question. Alternatively or additionally, the displaceability allows a change in the position of a central point of incidence 57 of the measurement radiation 18*a* on the deflection element 22 by at least 2 mm, in particular by at least 10 mm, in the direction of the translational degree of freedom in question.

Figure 4:
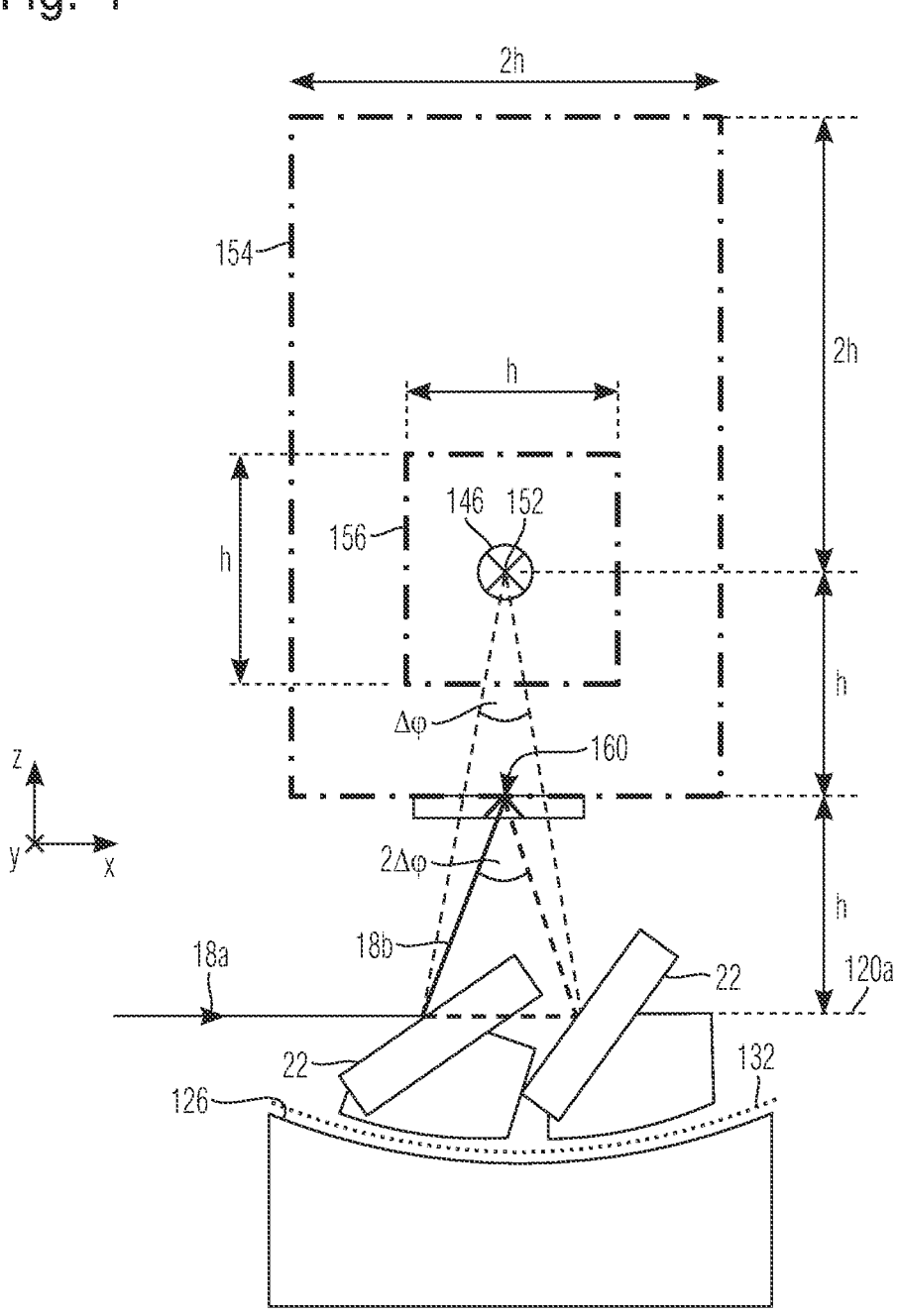
FIG. 4 shows an illustration of advantageous regions for the arrangement of the axis of rotation.

FIG. 4 serves to illustrate advantageous regions for the arrangement of the axis of rotation 146 in the embodiment of the interferometric measuring arrangement 10 with a curved guide rail 126 according to FIG. 3. As already mentioned above, the center 152 of the circumferential section 132 defined by the guide rail 126 corresponds to the intersection point of the axis of rotation 146 with the plane of the drawing.

A preferred region 154 for the center 152 of the guide rail 126 is defined by a rectangle which has an extent of 2h in the horizontal direction, i.e., parallel to the irradiation axis 120*a*, and an extent of 3h in the vertical direction, i.e., perpendicular to the irradiation axis 120*a*. h is the distance of the diffractive optical element 26-1 from the irradiation axis 120, more precisely the distance of a central irradiation point 160 of the measurement radiation 16*b* on the diffractive optical element 26-1 from the irradiation axis 120. At least for one embodiment variant, the distance for the second diffractive optical element 26-1 is unchanged. The rectangle defining the preferred region 154 relates to the area above the diffractive optical element 26-1 with the dimensions 2h×3h, wherein the irradiation point 160 is located in the middle of the lower edge of the rectangle.

A particularly preferred region 156 for the center 152 is defined by a further rectangle which has an extent of 1h both in the horizontal and in the vertical direction. The region 156 is arranged in particular so that its center is at a distance h from the irradiation point 160 of the measurement radiation on the diffractive optical element 26-1. A particularly advantageous embodiment variant is shown in the illustration according to FIG. 4, in which the center 152 assigned to the curved guide rail 126 coincides with the center of the region 156.

Figures 5, 6, 7:
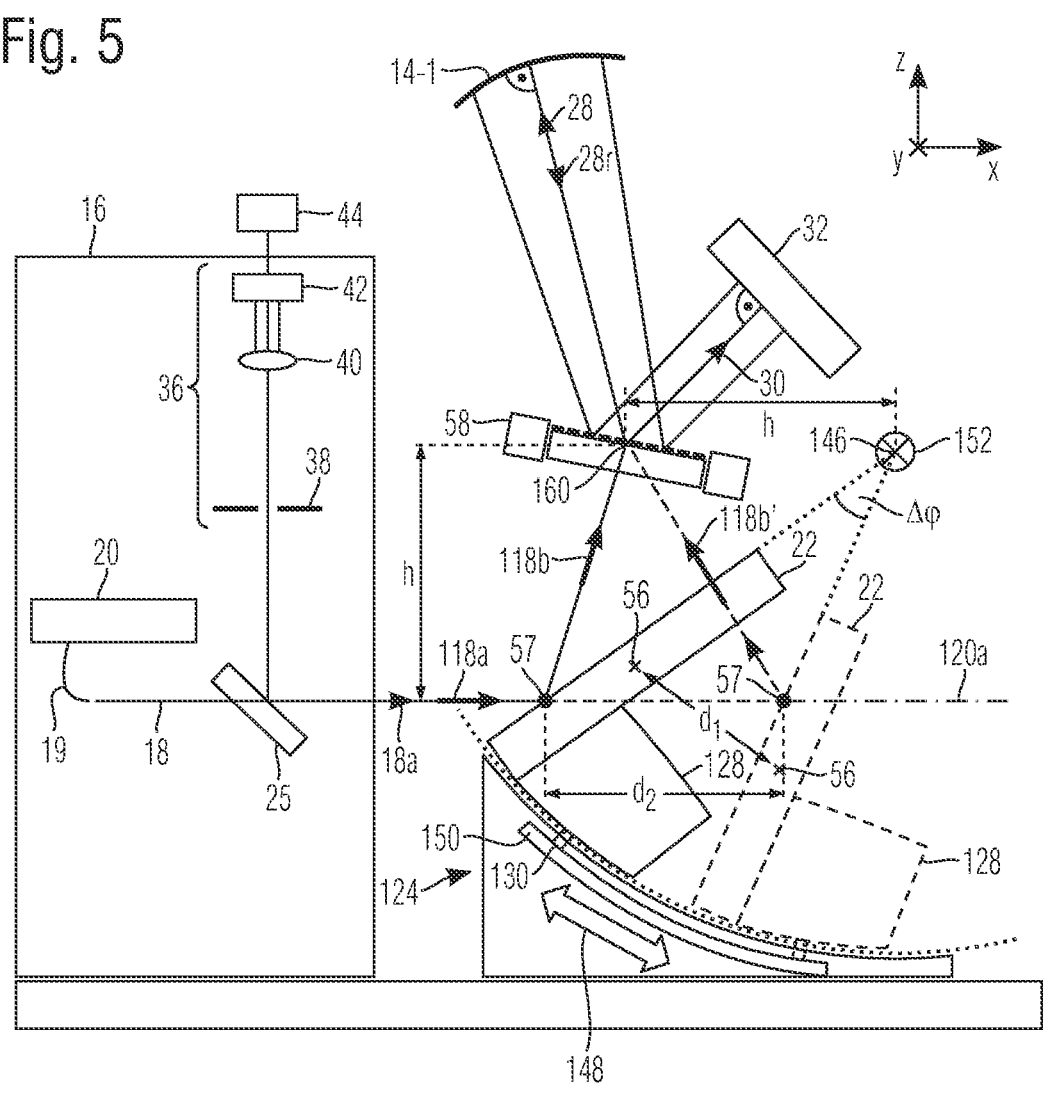
FIG. 5 shows a further embodiment of a measurement apparatus for interferometric shape measurement with a holding device for rotating the deflection element about an axis of rotation disposed outside of the deflection element.
FIG. 6 shows an alternative embodiment of the deflection element in the form of a reflection prism.
FIG. 7 shows a further alternative embodiment of the deflection element of a prism utilizing the refraction of light at the side surfaces.

In the embodiment illustrated in FIG. 3, the center 152 lies within the particularly preferred region. A further embodiment is shown in FIG. 5, which differs from the embodiment according to FIG. 3 only in that the center 152 assigned to the curved guide rail is located further to the right and further below. The center 152 is approximately at the distance h to the right of the irradiation point 160 and in the vertical direction at approximately the same height as the irradiation point 160 and is therefore arranged at the lower right corner of the preferred region 154 according to FIG. 4.

Figure 8:
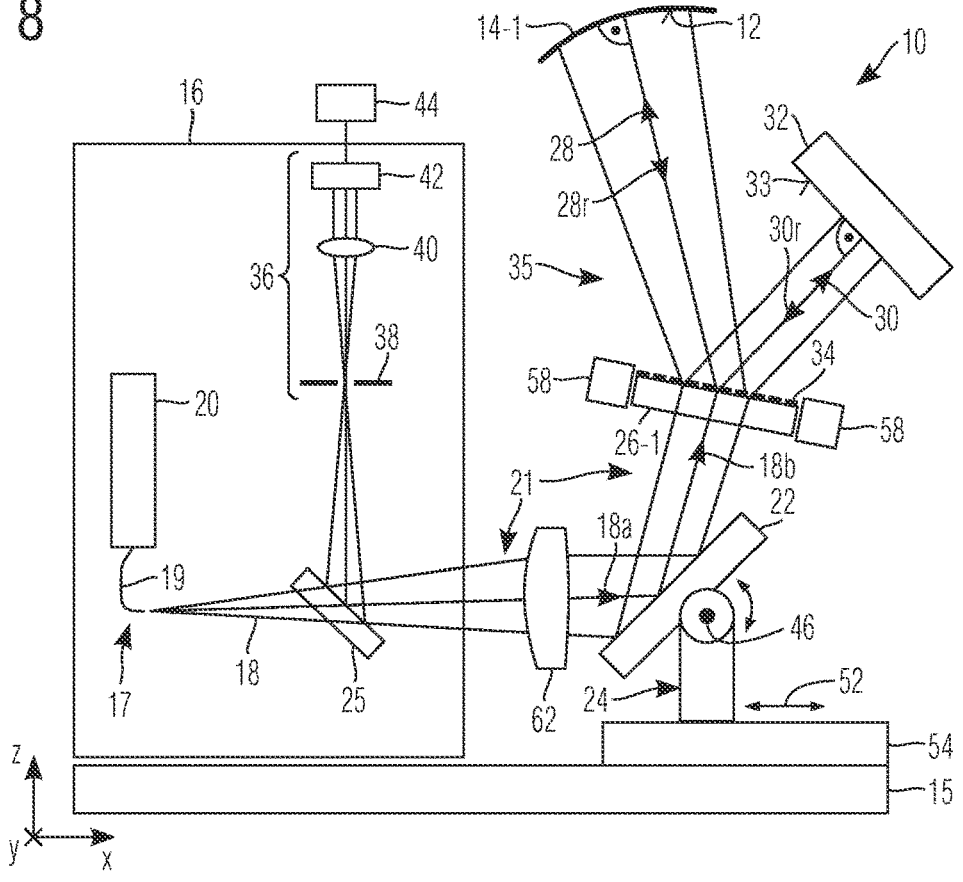
FIG. 8 shows a further embodiment of a measurement apparatus for interferometric shape measurement of a surface of a test object, in which a collimator is arranged upstream of the deflection element.

FIG. 8 illustrates a further embodiment of a measurement apparatus 10 for interferometric shape measurement of an optical surface 12 of a test object 14-1. This embodiment differs from the embodiment according to FIG. 1 only in that a collimator 62 is arranged upstream of the deflection element 22. The measurement radiation 18*a* and the measurement radiation 18*b* thus are not incident on the deflection element 22 or the diffractive optical element 26-1 as an expanding wave, as in FIG. 1, but in each case as a plane wave.

Figure 9:
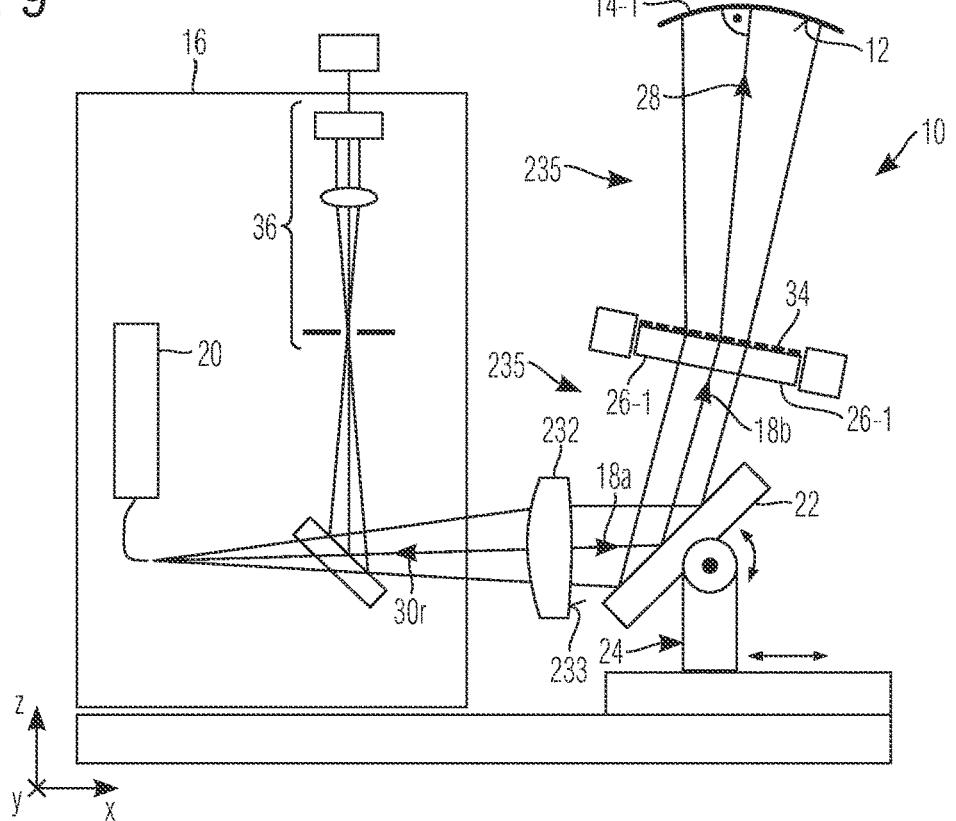
FIG. 9 shows a further embodiment of a measurement apparatus for interferometric shape measurement of a surface of a test object, which is designed as a Fizeau interferometer.

FIG. 9 illustrates a further embodiment of a measurement apparatus 10 for interferometric shape measurement of an optical surface 12 of a test object 14-1. The measurement apparatus 10 according to FIG. 9 differs from the measurement apparatus 10 according to FIG. 8 in that, instead of the reference element 32 designed as a reflective optical element, a reference element 232 in the form of a Fizeau collimator is provided. Instead of the diffractive optical element 26-1 according to FIG. 7, the Fizeau collimator is used to generate the reference wave 30 from the measurement radiation 18, wherein the reference wave is here already returning during the generation and is therefore denoted by the reference sign 30*r*. The Fizeau collimator can also be replaced by the combination of a collimator and a separate Fizeau element.

The reference element 232 configured as a Fizeau collimator is arranged in the beam path of the incoming measurement radiation 18 upstream of the deflection element 22 and has a Fizeau surface 233 at which part of the incoming measurement radiation 18 is reflected as the returning reference wave 30r. The Fizeau surface 233 is designed as a planar surface. The measurement apparatus 10 according to FIG. 7 is thus configured as a Fizeau interferometer. Since the reference wave 30 is no longer generated by the diffractive optical element 26-1, it can be implemented with simply encoded diffraction structures 34.

As mentioned above, the region of the interferometer 10 in which the test wave 28 and the reference wave 30 do not travel in the same beam path is referred to as the interferometer cavity. In the embodiment according to FIG. 7, the interferometer cavity 235 comprises the beam path of the measurement radiation 18a after passing through the Fizeau surface 233 and the beam path of the test wave 28 between the diffractive optical element 26-1 and the object under test 14-1. In the embodiment of the measurement apparatus 10 according to FIG. 7, the deflection element 22 is arranged within the interferometer cavity 235, as is evident from the drawing.

Rather than the holding device 24, the embodiment of the holding device 124 according to FIG. 3 can be integrated into the embodiments of the measurement apparatus 10 according to FIGS. 8 and 9.

Alternative embodiments for the deflection element 22 are illustrated in FIGS. 6 and 7. Unlike in FIGS. 1 to 5 or 8 and 9, in which a deflection element 22 configured as a mirror is shown, said deflection element can also be configured as a prism 22-1 or 22-2. In the embodiment according to FIG. 6, the prism 22-1 is designed as a reflection prism and is arranged in the corresponding measurement apparatus 10 according to one of FIGS. 1 to 5 or 8 and 9 in a manner such that the incoming measurement radiation 18a is normally incident on an irradiation prism surface 70. From there, the measurement radiation 18a travels inside the prism 22-1 to a reflection prism surface 74, is reflected there and then continues inside the prism 22-1 until it emerges from the prism 22-1 at an emission prism surface 72 as emitted measurement radiation 18b.

In the embodiment according to FIG. 7, the prism 22-2 is configured to utilize the refraction of light at the prism surfaces and is arranged in the corresponding measurement apparatus 10 according to one of FIGS. 1 to 5 or 8 and 9 in a manner such that the incoming measurement radiation 18a is incident on the irradiation surface 70 at an oblique angle. Upon entry into the prism 22-2, the measurement radiation 18a is then refracted towards the vertical, travels through the interior of the prism 22-2 and, on exiting the prism 22-2, is again refracted away from the vertical at the emission prism surface 72, which is oriented differently from the irradiation prism surface 70.

The dimensions explained above with reference to FIGS. 1 to 3 when displacing the geometric centroid 56 or the middle point of incidence 57 when changing the position of the deflection element 22 correspondingly apply to the respective geometric centroid 56 or the middle point of incidence 57 of the prisms 22-1 and 22-2.

The above description of exemplary embodiments, embodiments or embodiment variants should be understood to be by way of example. The disclosure effected thereby firstly enables the person skilled in the art to understand the present invention and the advantages associated therewith, and secondly encompasses alterations and modifications of the described structures and methods that will be apparent to and/or within the understanding of persons skilled in the art. Therefore, all such alterations and modifications, insofar as they fall within the scope of the invention in accordance with the definition in the accompanying claims as well as equivalents thereof are intended to be covered by the protection of the claims.

LIST OF REFERENCE SIGNS

10 Measurement apparatus
12 Optical surface
14-1 Test object
15 Frame
16 Illumination/detection module
17 Radiation source
18 Measurement radiation
18a Incoming measurement radiation
18b Emitted measurement radiation
19 Waveguide
20 Radiation-generating module
21 Beam path of the measurement radiation
22 Deflection element
22-1 Prism
22-2 Prism
23 Reflection surface
24 Holding device
25 Beam splitter
26-1 Diffractive optical element
26-2 Diffractive optical element
28 Test wave
28r Returning test wave
30 Reference wave
30r Returning reference wave
32 Reference element
33 Reflection surface
34 Diffraction structures
35 Interferometer cavity
36 Observation unit
48 Stop
40 Eyepiece
42 Detector
44 Evaluation device
46 Tilt axis
48 Tilting movement
50 Tilt actuator
52 Translational degree of freedom
54 Displacement actuator
55 Displacement
56 Geometric centroid
57 Middle point of incidence
58 Holding device
60 Test wave generation section
62 Collimator
70 Irradiation prism surface
72 Emission prism surface
74 Reflection prism surface
118a Direction vector
118b Direction vector
118b' Direction vector
120a Irradiation axis
120b Emission axis
124 Holding device
126 Curved guide rail
128 Guide part
130 Pulling element
132 Circumferential section
146 Axis of rotation
148 Rotational movement
150 Actuator
152 Center 154 Preferred region
156 Particularly preferred region
158 Center
160 Middle irradiation point
232 Reference element
233 Fizeau surface
235 Interferometer cavity

What is claimed is:

1. A measurement apparatus for interferometric shape measurement of a surface of a test object, comprising:
   a diffractive optical element configured to generate a test wave from incoming measurement radiation and to radiate the test wave onto the surface of the test object,
   a deflection element disposed upstream of the diffractive optical element in a beam path of the measurement radiation, and
   a holding device configured to hold the deflection element and to change a position of the deflection element relative to the measurement radiation radiated onto the deflection element by a combination of a tilting movement and a translational movement independent from other optical elements of the measurement apparatus.

2. The measurement apparatus as claimed in claim 1, wherein the holding device is configured to displace the position of the deflection element by at least 2 mm through the translational movement.

3. The measurement apparatus as claimed in claim 1, wherein the holding device is configured to change the position of the deflection element by at least 2 mrad through the tilting movement.

4. The measurement apparatus as claimed in claim 1, wherein the holding device comprises a tilting actuator configured to execute the tilting movement and a separate displacement actuator configured to execute the translational movement.

5. The measurement apparatus as claimed in claim 1, wherein the holding device comprises a curved guide rail configured to execute the tilting movement and the translational movement.

6. The measurement apparatus as claimed in claim 1, wherein the deflection element comprises a deflection mirror.

7. The measurement apparatus as claimed in claim 1, wherein the deflection element comprises a prism.

8. The measurement apparatus as claimed in claim 1, wherein the measurement apparatus defines an interferometer cavity, and the deflection element is arranged outside of the interferometer cavity.

9. The measurement apparatus as claimed in claim 1, wherein the measurement apparatus defines an interferometer cavity, and the deflection element is arranged within the interferometer cavity.

10. The measurement apparatus as claimed in claim 1, wherein the combination of the tilting movement and the translational movement is realized by a rotational movement with respect to an axis of rotation, wherein the axis of rotation is located at a distance from a geometric centroid of the deflection element.

11. A measurement apparatus for interferometric shape measurement of a surface of a test object, comprising:
   a diffractive optical element configured to generate a test wave from incoming measurement radiation and to radiate the test wave onto the surface of the test object,
   a deflection element disposed upstream of the diffractive optical element in a beam path of the measurement radiation, and a holding device configured to hold the deflection element and to change a position of the deflection element by a combination of a tilting movement and a translational movement, wherein the combination of the tilting movement and the translational movement is realized by a rotational movement with respect to an axis of rotation, wherein the axis of rotation is located at a distance of at least 2 mm from a geometric centroid of the deflection element.

12. The measurement apparatus as claimed in claim 11, wherein the axis of rotation is arranged such that an intersection point of the axis of rotation with a beam plane, spanned by a direction vector of the measurement radiation radiated onto the deflection element and a direction vector of the measurement radiation radiated by the deflection element, is disposed in the beam plane on a same side with respect to an irradiation axis defined by the direction vector of the measurement radiation radiated onto the deflection element as the diffractive optical element.

13. The measurement apparatus as claimed in claim 12, wherein the axis of rotation is arranged such that the intersection point of the axis of rotation with the beam plane is arranged in a region which, in relation to the diffractive optical element, is on a side opposite of the irradiation axis, wherein the region in the direction of the irradiation axis has an extent of at most twice a distance of the diffractive optical element from the irradiation axis and has an extent of at most three times the distance in a direction perpendicular to the irradiation axis.

14. The measurement apparatus as claimed in claim 13, wherein the region has an extent of at most once the distance both in the direction of the irradiation axis and transversely to the irradiation axis.

15. The measurement apparatus as claimed in claim 11, wherein the holding device comprises at least one actuator for carrying out the at least one rotational movement.

16. A method for interferometric shape measurement of a respective surface of a plurality of test objects, comprising:
   radiating measurement radiation onto a first diffractive optical element with a deflection element to generate a first test wave, and interferometrically measuring a surface shape of a first of the test objects using the first test wave,
   changing a position of the deflection element relative to the measurement radiation radiated onto the deflection element through a combination of a tilting movement and a translational movement wherein the titling movement and the translational movement of the deflection element is independent from other optical elements, and
   radiating the measurement radiation onto a second diffractive optical element with the deflection element subsequent to said changing of the position to generate a second test wave, and interferometrically measuring a surface shape of a second of the test objects using the second test wave.

17. The method as claimed in claim 16, further comprising arranging the second diffractive optical element instead of the first diffractive optical element in a test wave generation section of an interferometric measurement device before said radiating of the measurement radiation with the deflection element whose position has changed.

18. The method as claimed in claim 16,
  wherein the second diffractive optical element is arranged
    in a rotational position which deviates from a rotational
    position of the first diffractive optical element.

\* \* \* \* \*